US012100353B2

(12) United States Patent
Sakai

(10) Patent No.: US 12,100,353 B2
(45) Date of Patent: Sep. 24, 2024

(54) DISPLAY DEVICE

(71) Applicant: Sharp Display Technology Corporation, Kameyama (JP)

(72) Inventor: Tamotsu Sakai, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/287,666

(22) PCT Filed: Jun. 8, 2021

(86) PCT No.: PCT/JP2021/021707

§ 371 (c)(1),
(2) Date: Oct. 20, 2023

(87) PCT Pub. No.: WO2022/259357

PCT Pub. Date: Dec. 15, 2022

(65) Prior Publication Data

US 2024/0185782 A1 Jun. 6, 2024

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/043* (2013.01); *G09G 2310/0294* (2013.01); *G09G 2310/08* (2013.01)

(58) Field of Classification Search
CPC ......... G09G 3/3233; G09G 2300/0819; G09G 2320/0233; G09G 2320/045; G09G 2320/043; G09G 3/32; G09G 2300/043; G09G 3/3648; G09G 2300/0426;
(Continued)

(56) References Cited

U.S. PATENT DOCUMENTS 11,069,292 B1 * 7/2021 Heganovic ........... G09G 3/3233
2019/0147799 A1 * 5/2019 Kim ..................... G09G 3/3266
345/55

FOREIGN PATENT DOCUMENTS

CN 111344774 B * 9/2022 ............... G09G 3/28
JP 2018-040866 A 3/2018

OTHER PUBLICATIONS

CN-111344774-B (Year: 2022).*

* cited by examiner

*Primary Examiner* — Sanjiv D. Patel
(74) *Attorney, Agent, or Firm* — Keating & Bennett, LLP

(57) ABSTRACT

In a display device including pixel circuits including oxide TFTs, degradation in display quality caused by light irradiation onto the oxide TFTs is suppressed. A TFT having a channel region formed of silicon is adopted as a drive transistor. A TFT having a gate electrode; a first conductive electrode and a second conductive electrode that function as a drain electrode and a source electrode; a back-gate electrode; and a channel region formed of an oxide semiconductor is adopted as a threshold voltage compensation transistor. A second conductive electrode of the drive transistor is connected to the first conductive electrode of the threshold voltage compensation transistor, and a gate electrode of the drive transistor is connected to the second conductive electrode of the threshold voltage compensation transistor. Silicon connected to the second conductive electrode of the drive transistor is used as the back-gate electrode of the threshold voltage compensation transistor.

6 Claims, 13 Drawing Sheets

(58) Field of Classification Search
CPC ......... G09G 2300/0417; G09G 3/3208; G09G 2300/0439; H10K 59/00–95
See application file for complete search history.

DISPLAY DEVICE

TECHNICAL FIELD

The following disclosure relates to a display device including pixel circuits, each including a transistor having a channel region formed of an oxide semiconductor.

BACKGROUND ART

In recent years, an organic EL display device including pixel circuits, each including an organic EL element, has been put to practical use. The organic EL element is also called an organic light-emitting diode (OLED), and is a self-emissive display element that emits light at luminance determined based on a current flowing therethrough. As such, since the organic EL element is a self-emissive display element, the organic EL display device can easily achieve slimming down, a reduction in power consumption, an increase in luminance, etc., compared to a liquid crystal display device that requires a backlight, a color filter, and the like.

Regarding the pixel circuit of the organic EL display device, typically, a thin-film transistor (TFT) is adopted as a drive transistor for controlling supply of a current to the organic EL element. However, variations are likely to occur in the characteristics of the thin-film transistor. Specifically, variations are likely to occur in threshold voltage. If variations in threshold voltage occur in the drive transistors provided in a display unit, then variations in luminance occur, degrading display quality. Hence, there are proposed various types of processes (compensation processes) for compensating for variations in threshold voltage.

For schemes for the compensation processes, there are known an internal compensation scheme in which a compensation process is performed by providing, in a pixel circuit, a capacitor for holding information on a threshold voltage of a drive transistor, and an external compensation scheme in which a compensation process is performed by, for example, measuring, by a circuit provided external to a pixel circuit, the magnitude of a current flowing through a drive transistor under a predetermined condition, and correcting a video signal based on a result of the measurement.

For a pixel circuit of an organic EL display device that adopts the internal compensation scheme for a compensation process, there is known a pixel circuit that uses a P-channel thin-film transistor having a channel region formed of low-temperature polysilicon (LTPS). Since the low-temperature polysilicon has high mobility, the ability to drive an organic EL element can be increased by using, as a drive transistor, a thin-film transistor having a channel region formed of low-temperature polysilicon (hereinafter, referred to as "LTPS-TFT").

Note that, as will be described later, a pixel circuit of an organic EL display device according to an embodiment of this disclosure includes a thin-film transistor having a back-gate electrode. In relation to this matter, Japanese Laid-Open Patent Publication No. 2018-40866 discloses a configuration in which a predetermined potential is provided to a back-gate electrode of a transistor in a pixel circuit.

PRIOR ART DOCUMENT

Patent Document

[Patent Document 1] Japanese Laid-Open Patent Publication No. 2018-40866

SUMMARY

Problems to be Solved by the Invention

Meanwhile, in recent years, a thin-film transistor having a channel region formed of an oxide semiconductor (hereinafter, referred to as "oxide TFT") has received attention. The oxide TFT has a feature that off-leakage current is small and thus is suitable as a switching element in a pixel circuit, etc. Note that as the oxide TFT, typically, a thin-film transistor having a channel region formed of an oxide semiconductor containing indium, gallium, zinc, and oxygen (hereinafter, referred to as "IGZO-TFT") is adopted.

As described above, the oxide TFT has a feature that off-leakage current is small. However, when the oxide TFT is irradiated with light, off-leakage current increases due to the photovoltaic effect. The increase in off-leakage current causes, for example, a reduction in voltage to be held in a holding capacitor in a pixel circuit or an abnormality in a compensation process. As a result, display quality degrades.

An object of the following disclosure is therefore to suppress degradation in display quality which is caused by light irradiation onto oxide TFTs in a display device including pixel circuits including the oxide TFTs.

Means for Solving the Problems

A display device according to some embodiments of the present disclosure is a display device including: a panel substrate on which pixel circuits arranged in matrix form, a first power line to which a first power supply voltage is provided, a second power line to which a second power supply voltage is provided, and a data signal line to which a data voltage is provided are formed, wherein the pixel circuits each include:

- a display element provided between the first power line and the second power line and configured to emit light at luminance determined based on an amount of current supplied to the display element;
- a drive transistor having a gate electrode; a first conductive electrode and a second conductive electrode, one of which functions as a drain electrode and another one of which functions as a source electrode; and a channel region formed of silicon, the drive transistor being provided in series with the display element;
- a threshold voltage compensation transistor having a gate electrode; a first conductive electrode and a second conductive electrode, one of which functions as a drain electrode and another one of which functions as a source electrode; a back-gate electrode; and a channel region formed of an oxide semiconductor; and
- a holding capacitor connected to the gate electrode of the drive transistor, the first power supply voltage is provided to the first conductive electrode of the drive transistor during a period during which the display element should emit light, and the data voltage is provided to the first conductive electrode of the drive transistor during a period during which writing into the holding capacitor is performed, the second conductive electrode of the drive transistor is connected to the first conductive electrode of the threshold voltage compensation transistor, the gate electrode of the drive transistor is connected to the second conductive electrode of the threshold voltage compensation transistor, and silicon connected to the second conductive electrode of the drive transistor is used as the back-gate electrode of the threshold voltage compensation transistor.

Effects of the Invention

According to some embodiments of the present disclosure, a transistor having a channel region formed of an oxide semiconductor is adopted as a threshold voltage compensation transistor in a pixel circuit. Silicon connected to a second conductive electrode of a drive transistor is used as a back-gate electrode of the threshold voltage compensation transistor. Since the silicon can effectively shield, particularly, short-wavelength light, occurrence of off-leakage current at the threshold voltage compensation transistor which is caused by the photovoltaic effect is effectively suppressed. As such, in a display device including pixel circuits including oxide TFTs, degradation in display quality caused by light irradiation onto the oxide TFTs is suppressed. In addition, the back-gate electrode of the threshold voltage compensation transistor can be implemented by extending a layer of silicon that functions as a channel region of the drive transistor. Thus, there is no need to provide an additional step in a manufacturing process, and a reduction in yield caused by an increase in wiring density is prevented.

MODE FOR CARRYING OUT THE INVENTION

With reference to the accompanying drawings, an embodiment will be described below. Note that in the following description, it is assumed that i and j are integers greater than or equal to 2, n is an integer between 1 and i, inclusive, and m is an integer between 1 and j, inclusive.

1. Overall Configuration

Figure 2:
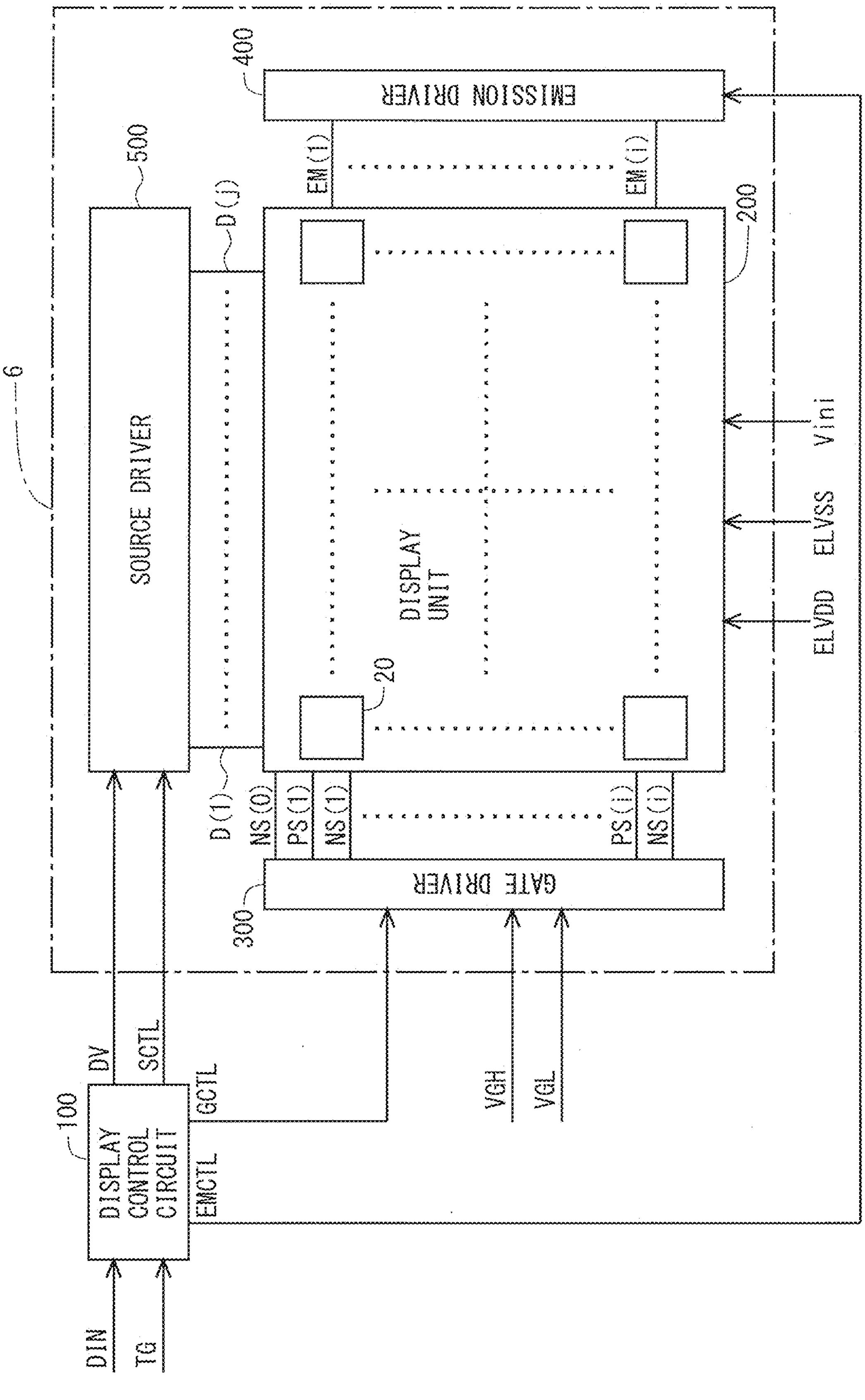
FIG. 2 is a block diagram showing an overall configuration of an organic EL display device according to the embodiment.

FIG. 2 is a block diagram showing an overall configuration of an organic EL display device according to one embodiment. As shown in FIG. 2, the organic EL display device includes a display control circuit 100, a display unit 200, a gate driver 300, an emission driver 400, and a source driver 500. The gate driver 300, the emission driver 400, and the source driver 500 are included in an organic EL display panel 6 having the display unit 200.

Figure 6:
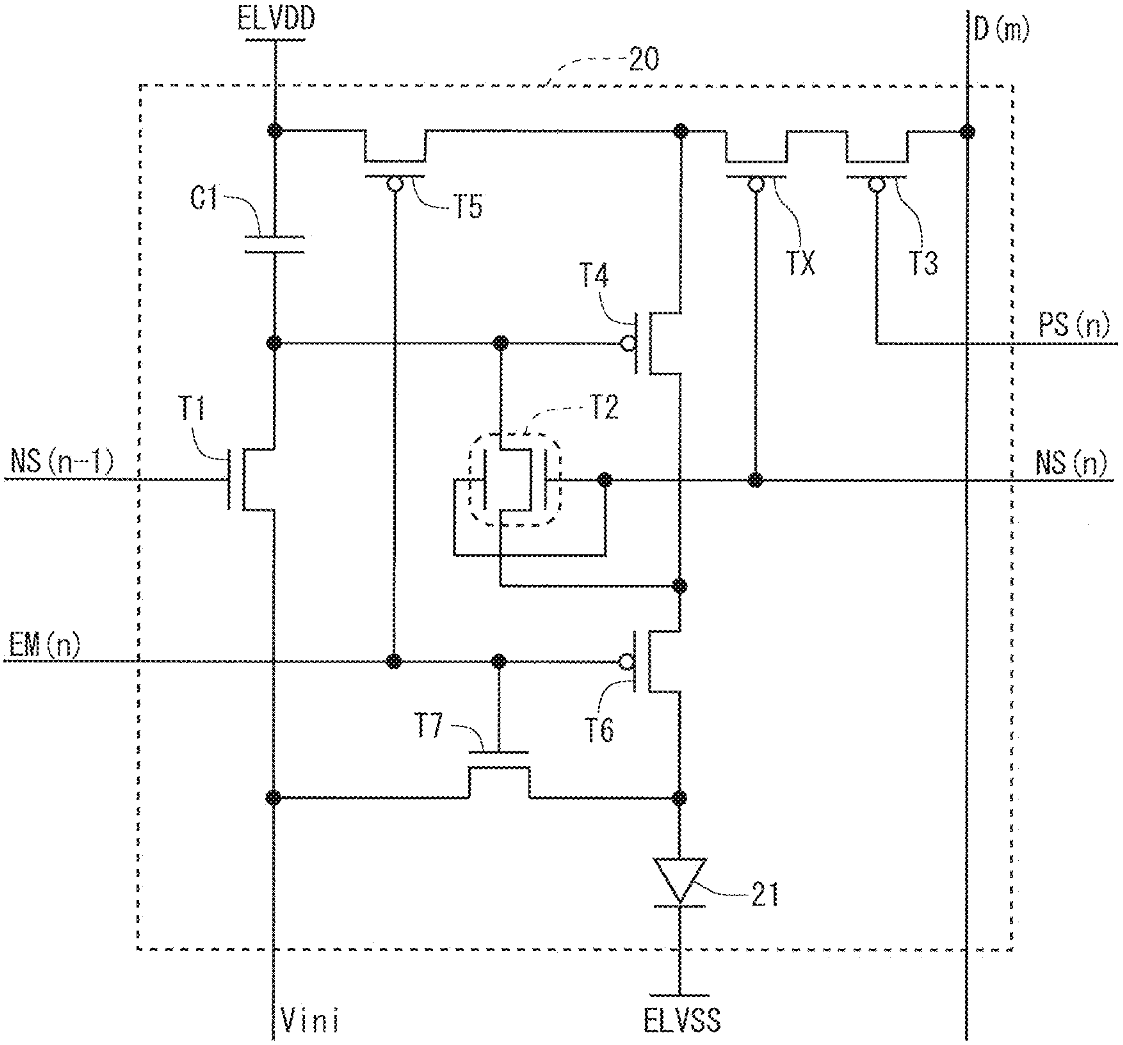
FIG. 6 is a circuit diagram for describing occurrence of a parasitic transistor in the comparative example.

In the display unit 200, there are disposed i first scanning signal lines PS(1) to PS(i), (i+1) second scanning signal lines NS(0) to NS(i), i light-emission control lines EM(1) to EM(i), and j data signal lines D(1) to D(j). Note that depiction of those lines in the display unit 200 is omitted in FIG. 6. In the display unit 200, there are also provided i×j pixel circuits 20 at intersecting portions of the i first scanning signal lines PS(1) to PS(i) and the j data signal lines D(1) to D(j). By thus providing the i×j pixel circuits 20, a pixel matrix of i rows×j columns is formed in the display unit 200. Though details will be described later, each pixel circuit 20 includes P-channel LTPS-TFTs and N-channel IGZO-TFTs. The first scanning signal lines PS(1) to PS(i) are signal lines for transmitting first scanning signals which are control signals for the P-channel LTPS-TFTs. The second scanning signal lines NS(0) to NS(i) are signal lines for transmitting second scanning signals which are control signals for the N-channel IGZO-TFTs. The light-emission control lines EM(1) to EM(i) are signal lines for transmitting light-emission control signals. The first scanning signal lines PS(1) to PS(i), the second scanning signal lines NS(0) to NS(i), and the light-emission control lines EM(1) to EM(i) are typically parallel to each other. The first scanning signal lines PS(1) to PS(i) and the data signal lines D(1) to D(j) are orthogonal to each other. In the following description, if necessary, first scanning signals which are provided to the respective first scanning signal lines PS(1) to PS(i) are also given reference characters PS(1) to PS(i), second scanning signals which are provided to the respective second scanning signal lines NS(0) to NS(i) are also given reference characters NS(0) to NS(i), light-emission control signals which are provided to the respective light-emission control lines EM(1) to EM(i) are also given reference characters EM(1) to EM(i), and data signals (data voltages) which are provided to the respective data signal lines D(1) to D(j) are also given reference characters D(1) to D(j).

In the display unit 200, there are further disposed power lines (not shown) which are shared between the i×j pixel circuits 20. More specifically, there are disposed a power line that supplies a high-level power supply voltage ELVDD for driving the organic EL elements (hereinafter, referred to as "high-level power line"), a power line that supplies a low-level power supply voltage ELVSS for driving the organic EL elements (hereinafter, referred to as "low-level power line"), and a power line that supplies an initialization voltage Vini (hereinafter, referred to as "initialization power line"). In the following description, if necessary, the high-level power line is also given reference character ELVDD, the low-level power line is also given reference character ELVSS, and the initialization power line is also given reference character Vini. The high-level power supply voltage ELVDD, the low-level power supply voltage ELVSS, and the initialization voltage Vini are supplied from a power supply circuit which is not shown. Note that, in the present embodiment, a first power supply voltage is implemented by the high-level power supply voltage ELVDD, a first power line is implemented by the high-level power line, a second power supply voltage is implemented by the low-level power supply voltage ELVSS, and a second power line is implemented by the low-level power line.

Operation of each component shown in FIG. 2 will be described below. The display control circuit 100 receives an input image signal DIN and a timing signal group (a horizontal synchronizing signal, a vertical synchronizing signal, etc.) TG which are sent from an external source, and outputs digital video signals DV, gate control signals GCTL that control operation of the gate driver 300, emission driver control signals EMCTL that control operation of the emission driver 400, and source control signals SCTL that control operation of the source driver 500. The gate control signals GCTL include a gate start pulse signal, a gate clock signal, etc. The emission driver control signals EMCTL include an emission start pulse signal, an emission clock signal, etc. The source control signals SCTL include a source start pulse signal, a source clock signal, a latch strobe signal, etc.

The gate driver 300 is connected to the first scanning signal lines PS(1) to PS(i) and the second scanning signal lines NS(0) to NS(i). The gate driver 300 applies first scanning signals to the first scanning signal lines PS(1) to PS(i) and applies second scanning signals to the second scanning signal lines NS(0) to NS(i), based on the gate control signals GCTL outputted from the display control circuit 100.

The emission driver 400 is connected to the light-emission control lines EM(1) to EM(i). The emission driver 400 applies light-emission control signals to the light-emission control lines EM(1) to EM(i), based on the emission driver control signals EMCTL outputted from the display control circuit 100.

The source driver 500 includes a j-bit shift register, a sampling circuit, a latch circuit, j D/A converters, and the like, which are not shown. The shift register has j cascade-connected registers. The shift register sequentially transfers a pulse of the source start pulse signal supplied to a register at an initial stage, from an input terminal to an output terminal, based on the source clock signal. In response to the transfer of the pulse, sampling pulses are outputted from respective stages of the shift register. Based on the sampling pulses, the sampling circuit stores digital video signals DV. The latch circuit captures and holds digital video signals DV for one row that are stored in the sampling circuit, in accordance with the latch strobe signal. The D/A converters are provided so as to correspond to the respective data signal lines D(1) to D(j). The D/A converters convert the digital video signals DV held in the latch circuit into analog voltages. The converted analog voltages are simultaneously applied, as data signals (data voltages), to all data signal lines D(1) to D(j).

In the above-described manner, the data signals are applied to the data signal lines D(1) to D(j), the first scanning signals are applied to the first scanning signal lines PS(1) to PS(i), the second scanning signals are applied to the second scanning signal lines NS(0) to NS(i), and the light-emission control signals are applied to the light-emission control lines EM(1) to EM(i), by which an image based on the input image signal DIN is displayed on the display unit 200.

2. Pixel Circuits

2.1 Comparative Example

Prior to describing a configuration of a pixel circuit 20 of the present embodiment, a comparative example will be described. The comparative example shows an exemplary configuration that is possibly used as a configuration of a pixel circuit 20 for dealing with the aforementioned increase in off-leakage current. Note that for the sake of convenience, the same components between the configuration of the comparative example and the configuration of the present embodiment are given the same reference characters. Note also that for each transistor (an N-channel IGZO-TFT and a P-channel LTPS-TFT), one of two electrodes that function as a source electrode and a drain electrode is referred to as "first conductive electrode" and the other one is referred to as "second conductive electrode".

Figure 3:
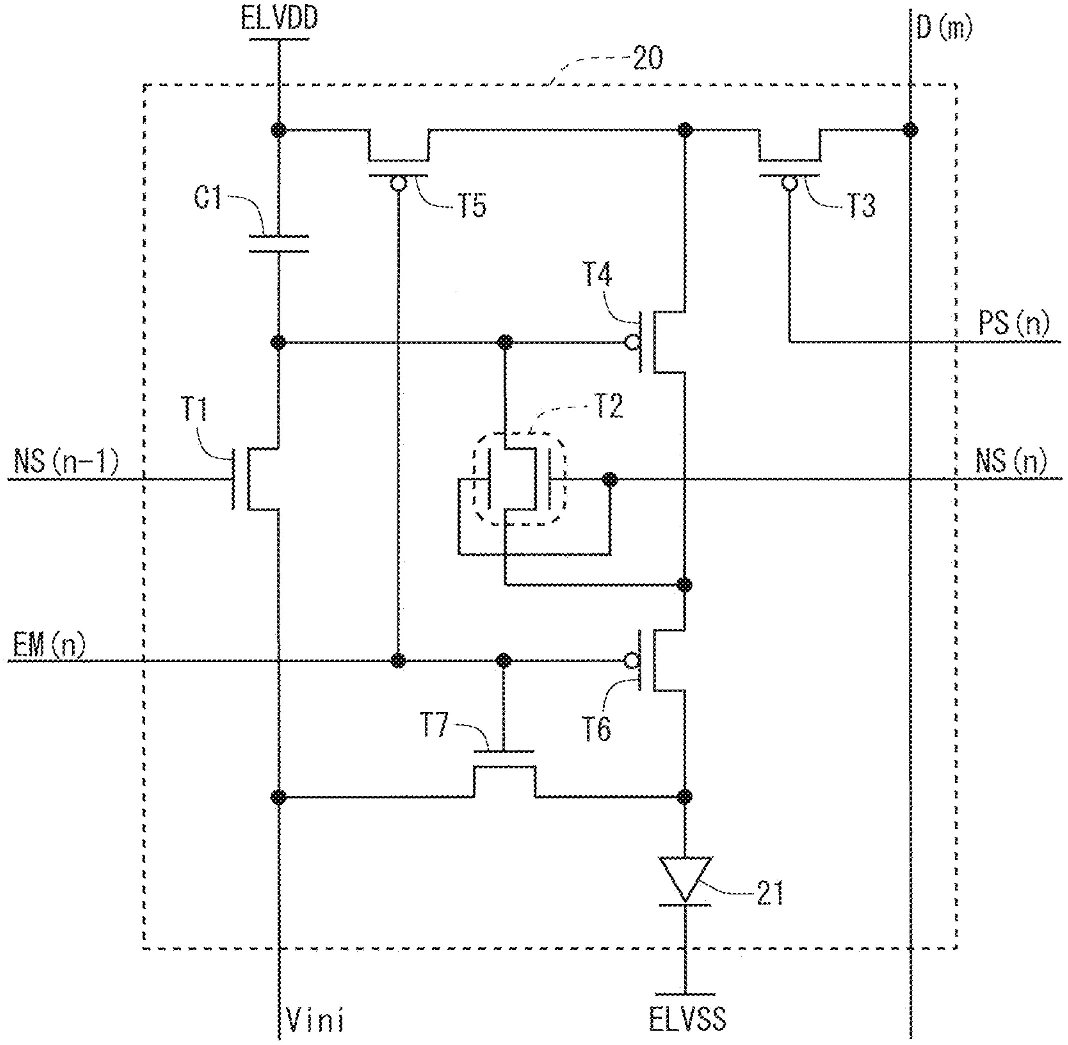
FIG. 3 is a circuit diagram showing a configuration of a pixel circuit of a comparative example.

FIG. 3 is a circuit diagram showing a configuration of a pixel circuit 20 of the comparative example. Note that the pixel circuit 20 shown in FIG. 3 is a pixel circuit 20 in an nth row and an mth column. As shown in FIG. 3, the pixel circuit 20 includes one organic EL element (organic light-emitting diode) 21 serving as a display element; seven transistors T1 to T7 (a first initialization transistor T1, a threshold voltage compensation transistor T2, a write control transistor T3, a drive transistor T4, a power supply control transistor T5, a light-emission control transistor T6, and a second initialization transistor T7); and one holding capacitor C1. The transistors T1, T2, and T7 are N-channel IGZO-TFTs. The transistors T3 to T6 are P-channel LTPS-TFTs. The holding capacitor C1 is a capacitive element including two electrodes (a first electrode and a second electrode).

Regarding the first initialization transistor T1, a second scanning signal line NS(n−1) in an (n−1)th row functions as a gate electrode, a first conductive electrode is connected to an initialization power line Vini, and a second conductive electrode is connected to a second conductive electrode of the threshold voltage compensation transistor T2, a gate electrode of the drive transistor T4, and the second electrode of the holding capacitor C1. Regarding the threshold voltage compensation transistor T2, a second scanning signal line NS(n) in the nth row functions as a gate electrode and a back-gate electrode, a first conductive electrode is connected to a second conductive electrode of the drive transistor T4 and a first conductive electrode of the light-emission control transistor T6, and the second conductive electrode is connected to the second conductive electrode of the first initialization transistor T1, the gate electrode of the drive transistor T4, and the second electrode of the holding capacitor C1.

Regarding the write control transistor T3, a first scanning signal line PS(n) in the nth row functions as a gate electrode, a first conductive electrode is connected to a data signal line D(m) in the mth column, and a second conductive electrode is connected to a first conductive electrode of the drive transistor T4 and a second conductive electrode of the power supply control transistor T5. Regarding the drive transistor T4, the gate electrode is connected to the second conductive electrode of the first initialization transistor T1, the second conductive electrode of the threshold voltage compensation transistor T2, and the second electrode of the holding capacitor C1, the first conductive electrode is connected to the second conductive electrode of the write control transistor T3 and the second conductive electrode of the power supply control transistor T5, and the second conductive electrode is connected to the first conductive electrode of the threshold voltage compensation transistor T2 and the first conductive electrode of the light-emission control transistor T6. Note that a high-level power supply voltage ELVDD is provided to the first conductive electrode of the drive transistor T4 during a period during which the organic EL element 21 should emit light, and a data signal D(m) is provided to the first conductive electrode of the drive transistor T4 during a period during which writing into the holding capacitor C1 is performed.

Regarding the power supply control transistor T5, a light-emission control line EM(n) in the nth row functions as a gate electrode, a first conductive electrode is connected to a high-level power line ELVDD and the first electrode of the holding capacitor C1, and the second conductive electrode is connected to the second conductive electrode of the write control transistor T3 and the first conductive electrode of the drive transistor T4. Regarding the light-emission control transistor T6, the light-emission control line EM(n) in the nth row functions as a gate electrode, the first conductive electrode is connected to the first conductive electrode of the threshold voltage compensation transistor T2 and the second conductive electrode of the drive transistor T4, and a second conductive electrode is connected to a second conductive electrode of the second initialization transistor T7 and an anode of the organic EL element 21. Regarding the second initialization transistor T7, the light-emission control line EM(n) in the nth row functions as a gate electrode, a first conductive electrode is connected to the initialization power line Vini, and the second conductive electrode is connected to the second conductive electrode of the light-emission control transistor T6 and the anode of the organic EL element 21.

Regarding the holding capacitor C1, the first electrode is connected to the high-level power line ELVDD and the first conductive electrode of the power supply control transistor T5, and the second electrode is connected to the second conductive electrode of the first initialization transistor T1, the second conductive electrode of the threshold voltage compensation transistor T2, and the gate electrode of the drive transistor T4. Regarding the organic EL element 21, the anode is connected to the second conductive electrode of the light-emission control transistor T6 and the second conductive electrode of the second initialization transistor T7, and a cathode is connected to a low-level power line ELVSS.

In the configuration shown in FIG. 3, in order to implement light shielding to a channel region of the threshold voltage compensation transistor T2, the threshold voltage compensation transistor T2 is provided with the back-gate electrode. As described above, regarding the threshold voltage compensation transistor T2, the second scanning signal line NS(n) in the nth row functions as the gate electrode and the back-gate electrode. That is, the same signal (second scanning signal) is provided to the gate electrode of the threshold voltage compensation transistor T2 and the back-gate electrode thereof.

Figure 4:
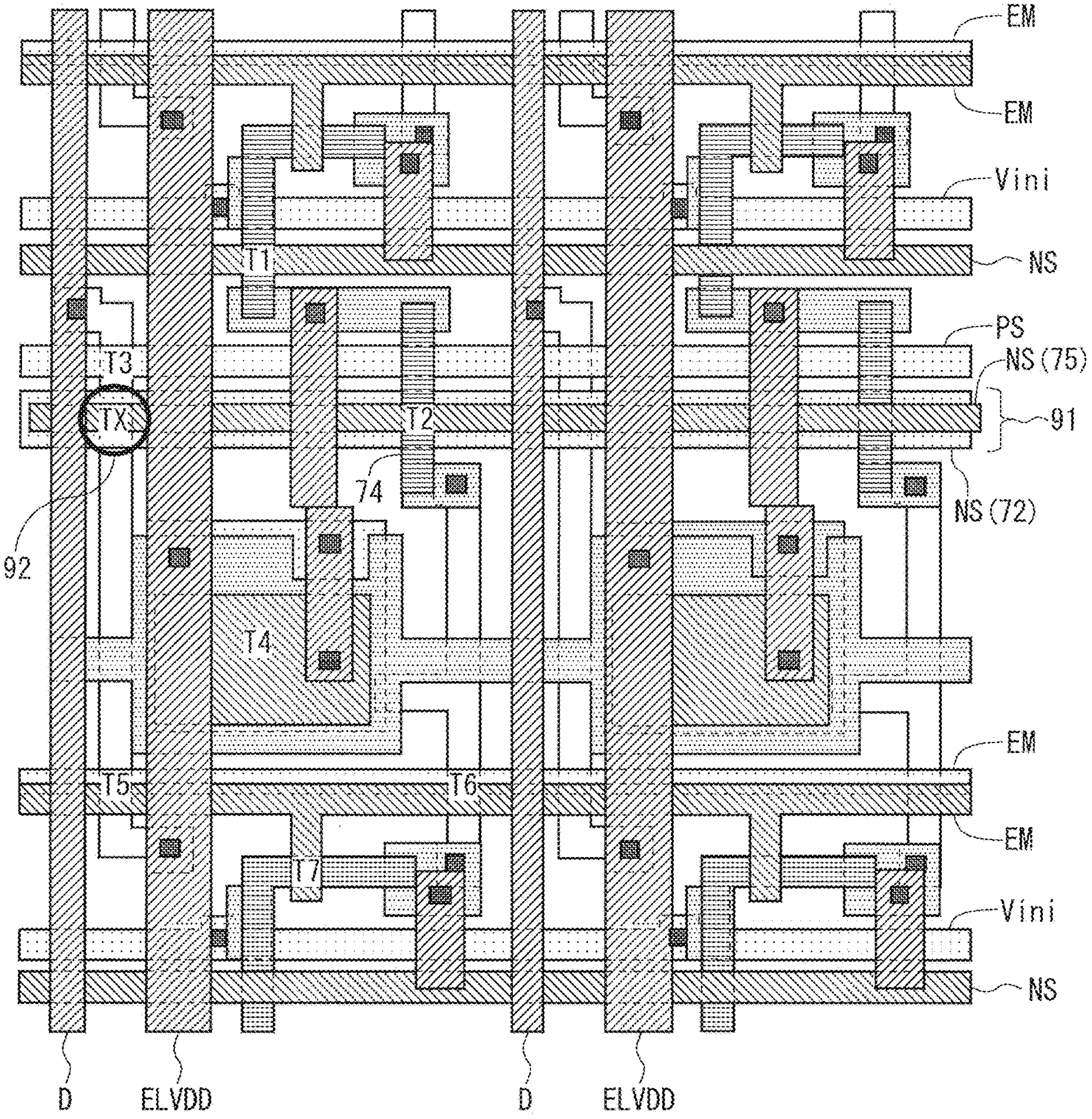
FIG. 4 is a diagram showing a layout that implements the pixel circuit having the configuration shown in FIG. 3.

FIG. 4 is a diagram showing a layout that implements the pixel circuit 20 having the configuration shown in FIG. 3. Note that in FIG. 4, locations corresponding to the gate electrodes of seven transistors T1 to T7 included in a given pixel circuit 20 are given their corresponding reference characters T1 to T7.

Figure 5:
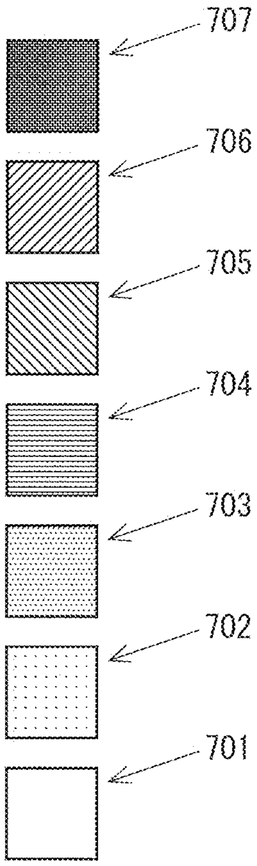
FIG. 5 is a diagram for describing layers formed on a substrate constituting an organic EL display panel.

Meanwhile, six layers, excluding insulating layers, are formed on a substrate (panel substrate) constituting the organic EL display panel 6. FIG. 4 shows the six layers in a distinguishable manner. The six layers will be described with reference to FIG. 5. A layer shown in a manner indicated by an arrow given reference character 701 is a first semiconductor layer which is a layer of polysilicon (polycrystalline silicon). Channel regions of P-channel LTPS-TFTs (the write control transistor T3, the drive transistor T4, the power supply control transistor T5, and the light-emission control transistor T6) in the pixel circuit 20 are included in the first semiconductor layer. A layer shown in a manner indicated by an arrow given reference character 702 is a first scanning wiring layer which is a layer of molybdenum (Mo) and which is a layer including the first scanning signal lines PS(1) to PS(i). For example, the gate electrode of the write control transistor T3 is included in the first scanning wiring layer. A layer shown in a manner indicated by an arrow given reference character 703 is a metal layer which is a layer of molybdenum (Mo). For example, the second conductive electrode of the drive transistor T4 and the first conductive electrode of the threshold voltage compensation transistor T2 are included in the metal layer. A layer shown in a manner indicated by an arrow given reference character 704 is a second semiconductor layer which is a layer of an oxide semiconductor. Chanel regions of N-channel IGZO-TFTs (the first initialization transistor T1, the threshold voltage compensation transistor T2, and the second initialization transistor T7) in the pixel circuit 20 are included in the second semiconductor layer. A layer shown in a manner indicated by an arrow given reference character 705 is a second scanning wiring layer which is a layer of titanium (Ti)-aluminum (Al)-titanium (Ti) (a layer of titanium, aluminum, and titanium stacked on top of each other) and which is a layer including the second scanning signal lines NS(0) to NS(i). For example, the gate electrode of the threshold voltage compensation transistor T2 is included in the second scanning wiring layer. A layer shown in a manner indicated by an arrow given reference character 706 is a display wiring layer which is a layer of titanium (Ti)-aluminum (Al)-titanium (Ti) and which is a layer including the high-level power line ELVDD and the data signal lines D(1) to D(j). Note that a contact for electrically connecting a given layer to another layer is shown in a manner indicated by an arrow given reference character 707. In the following description, if necessary, the first semiconductor layer is given reference character 71, the first scanning wiring layer is given reference character 72, the metal layer is given reference character 73, the second semiconductor layer is given reference character 74, the second scanning wiring layer is given reference character 75, and the display wiring layer is given reference character 76.

For the above-described six layers, the first semiconductor layer 71, the first scanning wiring layer 72, the metal layer 73, the second semiconductor layer 74, the second scanning wiring layer 75, and the display wiring layer 76 are stacked in this order from the bottom to the top on the panel substrate.

Here, when taking a look at a portion given reference character 91 in FIG. 4, it can be grasped that the first scanning wiring layer 72 and the second scanning wiring layer 75 are stacked together. For these layers, near the threshold voltage compensation transistor T2, a part of the second scanning wiring layer 75 functions as the gate electrode of the threshold voltage compensation transistor T2, and a part of the first scanning wiring layer 72 functions as the back-gate electrode of the threshold voltage compensation transistor T2. A portion of the first scanning wiring layer 72 that functions as the back-gate electrode is formed below the second semiconductor layer 74 that serves as the channel region of the threshold voltage compensation transistor T2. By this, light irradiation onto the channel region of the threshold voltage compensation transistor T2 is suppressed. In addition, since the same signal is provided to the gate electrode and the back-gate electrode of the threshold voltage compensation transistor T2, sufficient on/off characteristics can be obtained for the threshold voltage compensation transistor T2.

However, according to the layout shown in FIG. 4, a parasitic transistor TX is formed at a portion given reference character 92. Taking this into account, the configuration of the pixel circuit 20 results in one shown in FIG. 6. According to the configuration shown in FIG. 6, the parasitic transistor TX is in off state during a period during which the threshold voltage compensation transistor T2 and the write control transistor T3 are maintained in on state to perform writing into the holding capacitor C1. Therefore, normal writing into the holding capacitor C1 and a normal compensation process are not performed. Hence, the applicant of present application proposes a the configuration shown below so that even if the components of the pixel circuit 20 include an oxide TFT (specifically, even if the threshold voltage compensation transistor T2 is implemented by an oxide TFT), normal writing into the holding capacitor C1 and a normal compensation process can be performed.

2.2 Configuration and Operation of a Pixel Circuit

Figure 1:
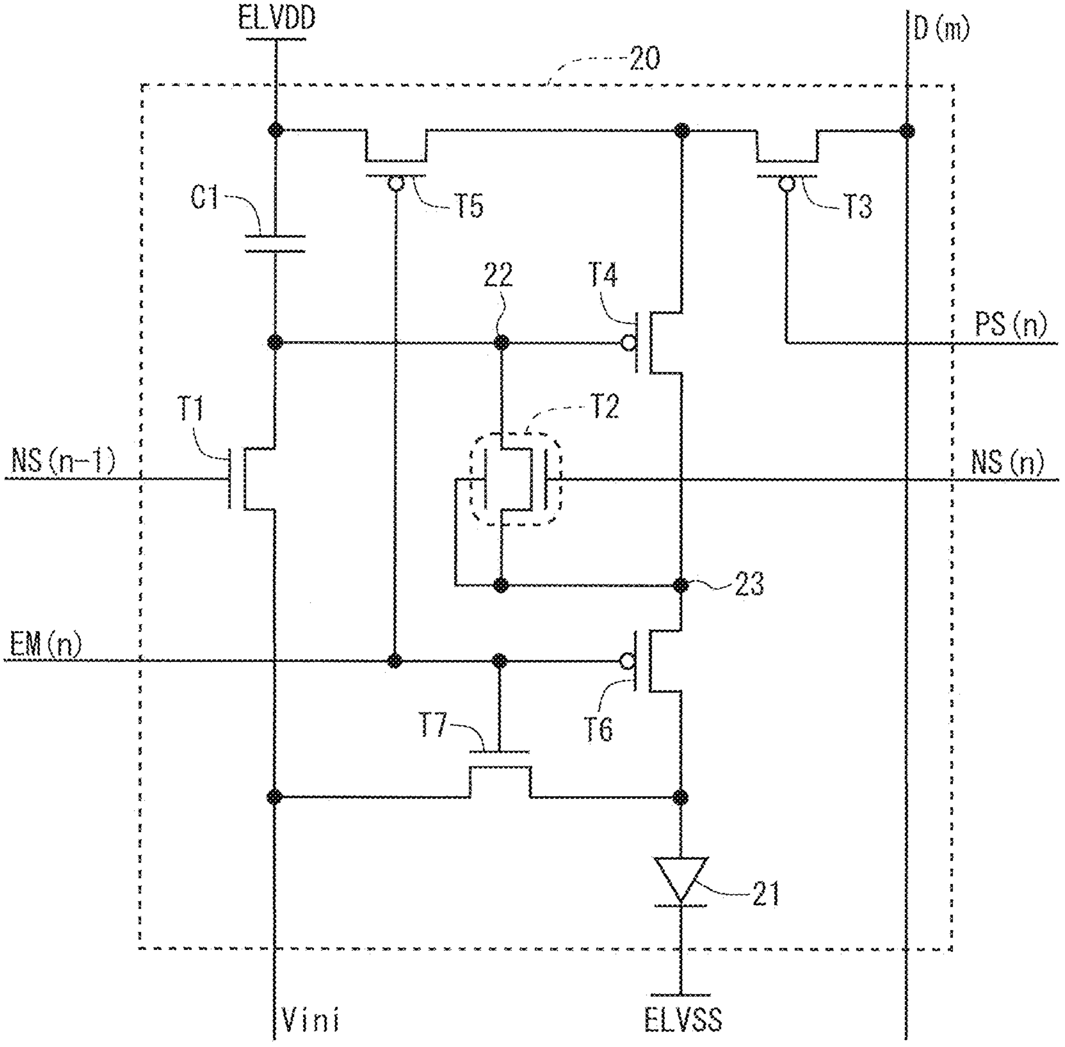
FIG. 1 is a circuit diagram showing a configuration of a pixel circuit in an nth row and an mth column in one embodiment.

FIG. 1 is a circuit diagram showing a configuration of a pixel circuit (a pixel circuit in an nth row and an mth column) 20 of the present embodiment. In the present embodiment, too, in order to implement light shielding to the channel region of the threshold voltage compensation transistor T2, the threshold voltage compensation transistor T2 is provided with a back-gate electrode. In the comparative example (see FIG. 3), the back-gate electrode of the threshold voltage compensation transistor T2 is connected to the second scanning signal line NS(n) in the nth row, but in the present embodiment, the back-gate electrode of the threshold voltage compensation transistor T2 is connected to the second conductive electrode of the drive transistor T4 and the first conductive electrode of the light-emission control transistor T6. Other than that, the present embodiment is the same as the comparative example and thus description is omitted.

Figure 7:
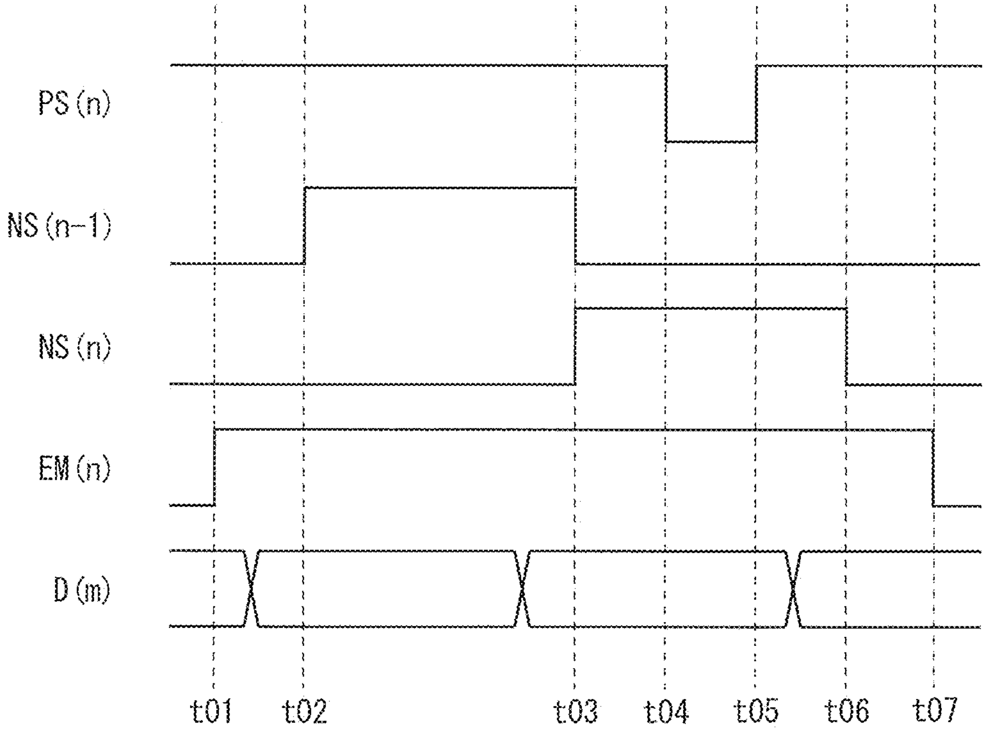
FIG. 7 is a timing chart for describing operation of the pixel circuit in the embodiment.

With reference to FIG. 7, operation of the pixel circuit 20 of the present embodiment will be described. Note, however, that the operation shown here is an example and thus operation is not limited thereto. Before time t01, the first scanning signal PS(n) is at high level, and the second scanning signal NS(n−1), the second scanning signal NS(n), and the light-emission control signal EM(n) are at low level. In this state, the power supply control transistor T5 and the light-emission control transistor T6 are in on state and the second initialization transistor T7 is in off state. Thus, a drive current based on a charged voltage in the holding capacitor C1 is supplied to the organic EL element 21, and the organic EL element 21 emits light according to the magnitude of the drive current.

At time t01, the light-emission control signal EM(n) changes from low level to high level. By this, the power supply control transistor T5 and the light-emission control transistor T6 go into off state. As a result, the supply of the drive current to the organic EL element 21 is interrupted, and the organic EL element 21 goes into turn-off state. In addition, by the light-emission control signal EM(n) changing from low level to high level, the second initialization transistor T7 goes into on state. By this, the anode voltage of the organic EL element 21 is initialized based on the initialization voltage Vini.

At time t02, the second scanning signal NS(n−1) changes from low level to high level. By this, the first initialization transistor T1 goes into on state. As a result, the gate voltage of the drive transistor T4 is initialized. That is, the gate voltage of the drive transistor T4 becomes equal to the initialization voltage Vini.

At time t03, the second scanning signal NS(n−1) changes from high level to low level. By this, the first initialization transistor T1 goes into off state. In addition, at time t03, the second scanning signal NS(n) changes from low level to high level. By this, the threshold voltage compensation transistor T2 goes into on state.

At time t04, the first scanning signal PS(n) changes from high level to low level. By this, the write control transistor T3 goes into on state. Since the threshold voltage compensation transistor T2 goes into on state at time t03, by the write control transistor T3 going into on state at time t04, a data signal D(m) is provided to the second electrode of the holding capacitor C1 through the write control transistor T3, the drive transistor T4, and the threshold voltage compensation transistor T2. By this, the holding capacitor C1 is charged.

At time t05, the first scanning signal PS(n) changes from low level to high level. By this, the write control transistor T3 goes into off state.

At time t06, the second scanning signal NS(n) changes from high level to low level. By this, the threshold voltage compensation transistor T2 goes into off state.

At time t07, the light-emission control signal EM(n) changes from high level to low level. By this, the second initialization transistor T7 goes into off state and the power supply control transistor T5 and the light-emission control transistor T6 go into on state, and a drive current based on a charged voltage in the holding capacitor C1 is supplied to the organic EL element 21. As a result, the organic EL element 21 emits light according to the magnitude of the drive current. Thereafter, the organic EL element 21 emits light throughout a period until the next time the light-emission control signal EM(n) changes from low level to high level. A period during which a corresponding light-emission control signal EM(n) is thus maintained at low level is hereinafter referred to as “light-emission period”.

Figure 8:
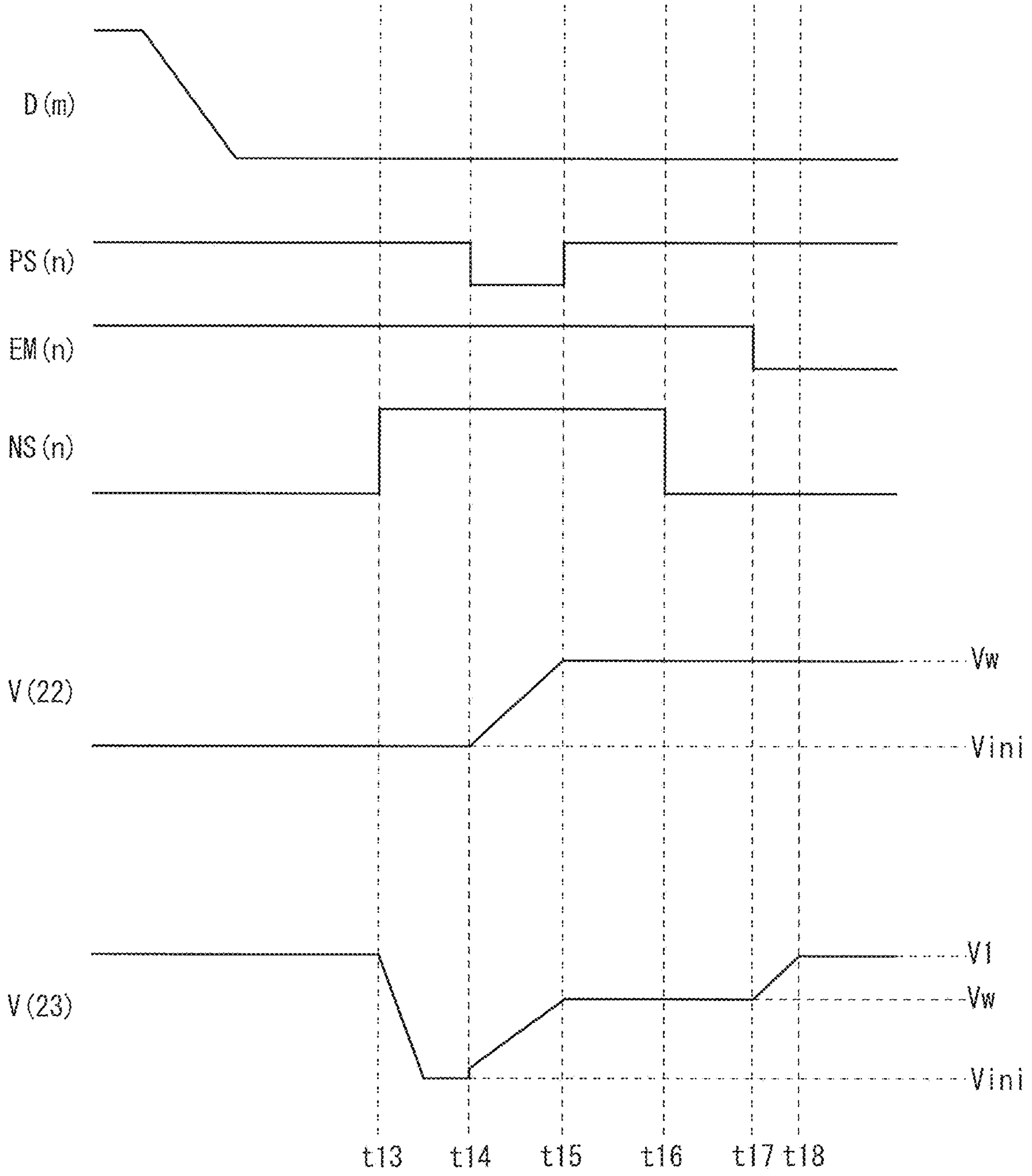
FIG. 8 is a timing chart for describing operation of the pixel circuit when white display is performed in the embodiment.
Figure 9:
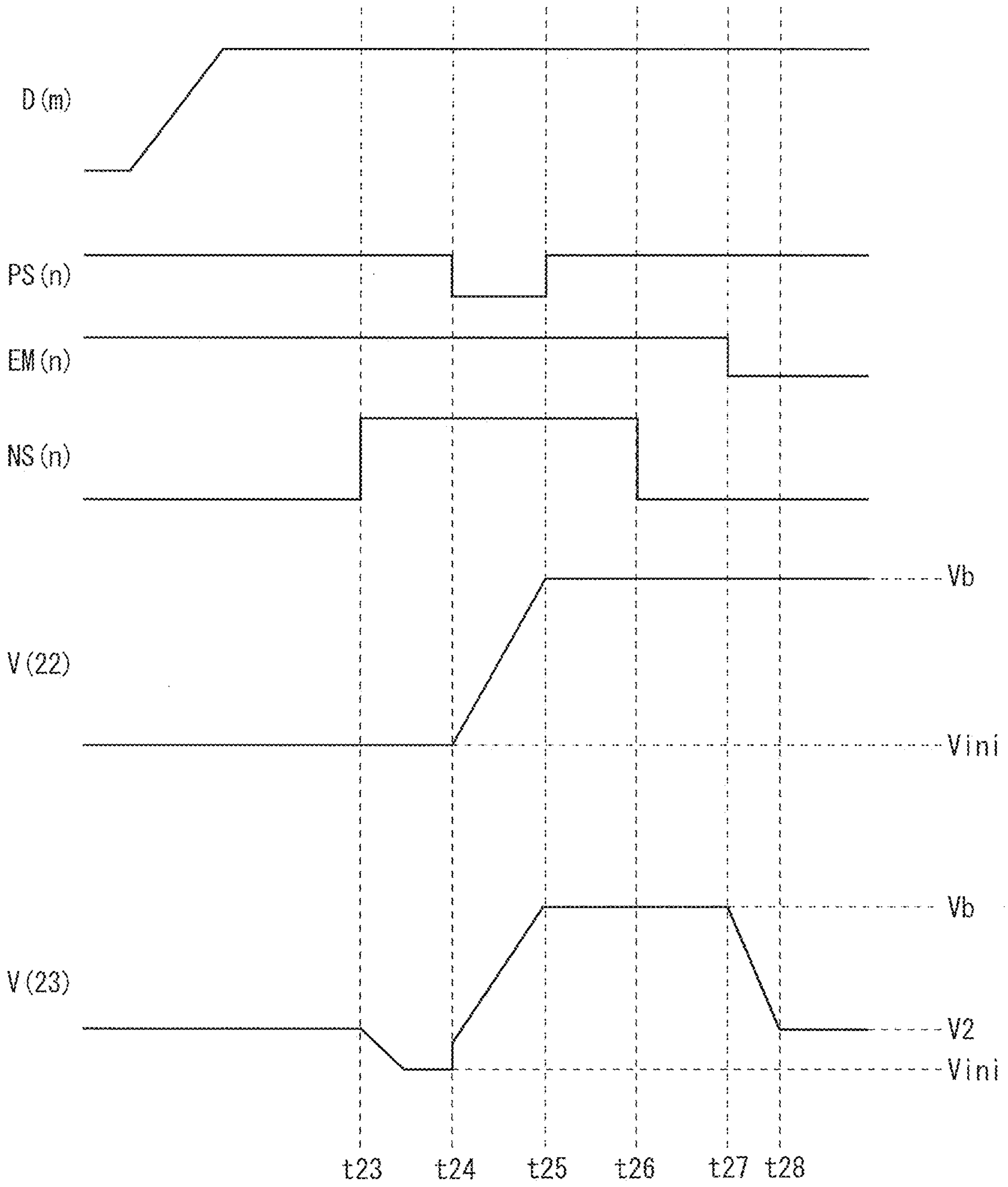
FIG. 9 is a timing chart for describing operation of the pixel circuit when black display is performed in the embodiment.

With reference to FIGS. 8 and 9, changes in potential at nodes given reference characters 22 and 23 in FIG. 1 will be described with respect to the cases in which white display and black display are performed, respectively. The node 22 corresponds to the second conductive electrode of the threshold voltage compensation transistor T2, the gate electrode of the drive transistor T4, the second conductive electrode of the first initialization transistor T1, and the second electrode of the holding capacitor C1, and the node 23 corresponds to the first conductive electrode of the threshold voltage compensation transistor T2, the back-gate electrode of the threshold voltage compensation transistor T2, the second conductive electrode of the drive transistor T4, and the first conductive electrode of the light-emission control transistor T6. In FIGS. 8 and 9, V(22) represents the potential at the node 22 and V(23) represents the potential at the node 23. Note that in this case, too, the pixel circuit 20 in the nth row and the mth column is taken a look at.

First, with reference to FIG. 8, an example of changes in potential at the node 22 and the node 23 when white display is performed will be described. Note that time t13 to t17 in FIG. 8 correspond to time t03 to t07 in FIG. 7.

During a predetermined period before time t13, by the second scanning signal NS(n−1) being at high level, the potential at the node 22 is a potential corresponding to the initialization voltage Vini. At time t13, the second scanning signal NS(n) changes from low level to high level, by which the threshold voltage compensation transistor T2 goes into on state. By this, during a time from time t13 to t14, the potential at the node 23 reaches a potential corresponding to the initialization voltage Vini.

At time t14, the first scanning signal PS(n) changes from high level to low level, thereby bringing the write control transistor T3 into on state, by which a data signal D(m) corresponding to white display is provided to the second electrode of the holding capacitor C1. Thus, in a period until the write control transistor T3 goes into off state by the first scanning signal PS(n) changing from low level to high level at time t15, the potential at the node 22 and the potential at the node 23 increase to a potential Vw corresponding to white display. Thereafter, at time t16, the second scanning signal NS(n) changes from high level to low level, by which the threshold voltage compensation transistor T2 goes into off state. Before and after this time t16, there is no change in the potential at the node 22 and the potential at the node 23.

At time t17, the light-emission control signal EM(n) changes from high level to low level, by which the second initialization transistor T7 goes into off state and the power supply control transistor T5 and the light-emission control transistor T6 go into on state. By this, a drive current is supplied to the organic EL element 21. At this time, a relatively large drive current is supplied to the organic EL element 21, and thus, the potential at the node 23 increases. As a result, at time t18, the potential at the node 23 reaches a potential V1 higher than the above-described potential Vw.

Next, with reference to FIG. 9, an example of changes in potential at the node 22 and the node 23 when black display is performed will be described. Note that time t23 to t27 in FIG. 9 correspond to time t03 to t07 in FIG. 7.

Changes occurring during a period before time t24 are the same as those occurring when white display is performed (a period before time t14 in FIG. 8). At time t24, the first scanning signal PS(n) changes from high level to low level, thereby bringing the write control transistor T3 into on state, by which a data signal D(m) corresponding to black display is provided to the second electrode of the holding capacitor C1. Thus, in a period until the write control transistor T3 goes into off state by the first scanning signal PS(n) changing from low level to high level at time t25, the potential at the node 22 and the potential at the node 23 increase to a potential Vb corresponding to black display. Note that the potential Vb corresponding to black display is higher than the potential Vw corresponding to white display. Thereafter, at time t26, the second scanning signal NS(n) changes from high level to low level, by which the threshold voltage compensation transistor T2 goes into off state. Before and after this time t26, there is no change in the potential at the node 22 and the potential at the node 23.

At time t27, the light-emission control signal EM(n) changes from high level to low level, by which the second initialization transistor T7 goes into off state and the power supply control transistor T5 and the light-emission control transistor T6 go into on state. However, at this time, since almost no drive current is supplied to the organic EL element 21, the potential at the node 23 decreases. As a result, at time t28, the potential at the node 23 reaches a potential V2 lower than the above-described potential V1 (see FIG. 8).

As above, when black display is performed, compared to when white display is performed, the potential at the node 23 during a light-emission period remarkably decreases. That is, when black display is performed, the potential at the threshold voltage the back-gate electrode of compensation transistor T2 is maintained at a remarkably low potential during the light-emission period.

Meanwhile, when off-leakage current has occurred during a period during which black display is performed, there is a great influence on a display image, but even if off-leakage current has occurred during a period during which white display is performed, the influence on a display image is relatively small. Thus, if an off characteristic of the threshold voltage compensation transistor T2 during a period during which black display is performed is favorably maintained, then a problem concerning display that is caused by an electrical connection between the back-gate electrode of the threshold voltage compensation transistor T2 and the second conductive electrode of the drive transistor T4 does not particularly occur. Regarding this, when black display is performed, the potential at the node 23 remarkably decreases as described above, and thus, the potential at the back-gate electrode of the threshold voltage compensation transistor T2 during a period during which black display is performed can be sufficiently reduced. For example, a negative voltage can be applied to the back-gate electrode of the threshold voltage compensation transistor T2 throughout a period during which black display is performed. By this, during a period during which black display is performed, the threshold voltage compensation transistor T2 is reliably maintained in off state.

From the above, even if a configuration in which the back-gate electrode of the threshold voltage compensation transistor T2 is electrically connected to the second conductive electrode of the drive transistor T4 is adopted regarding the pixel circuit 20, a problem concerning display that is caused by adopting such configuration does not particularly occur.

2.3 Layout of a Pixel Circuit

Figure 10:
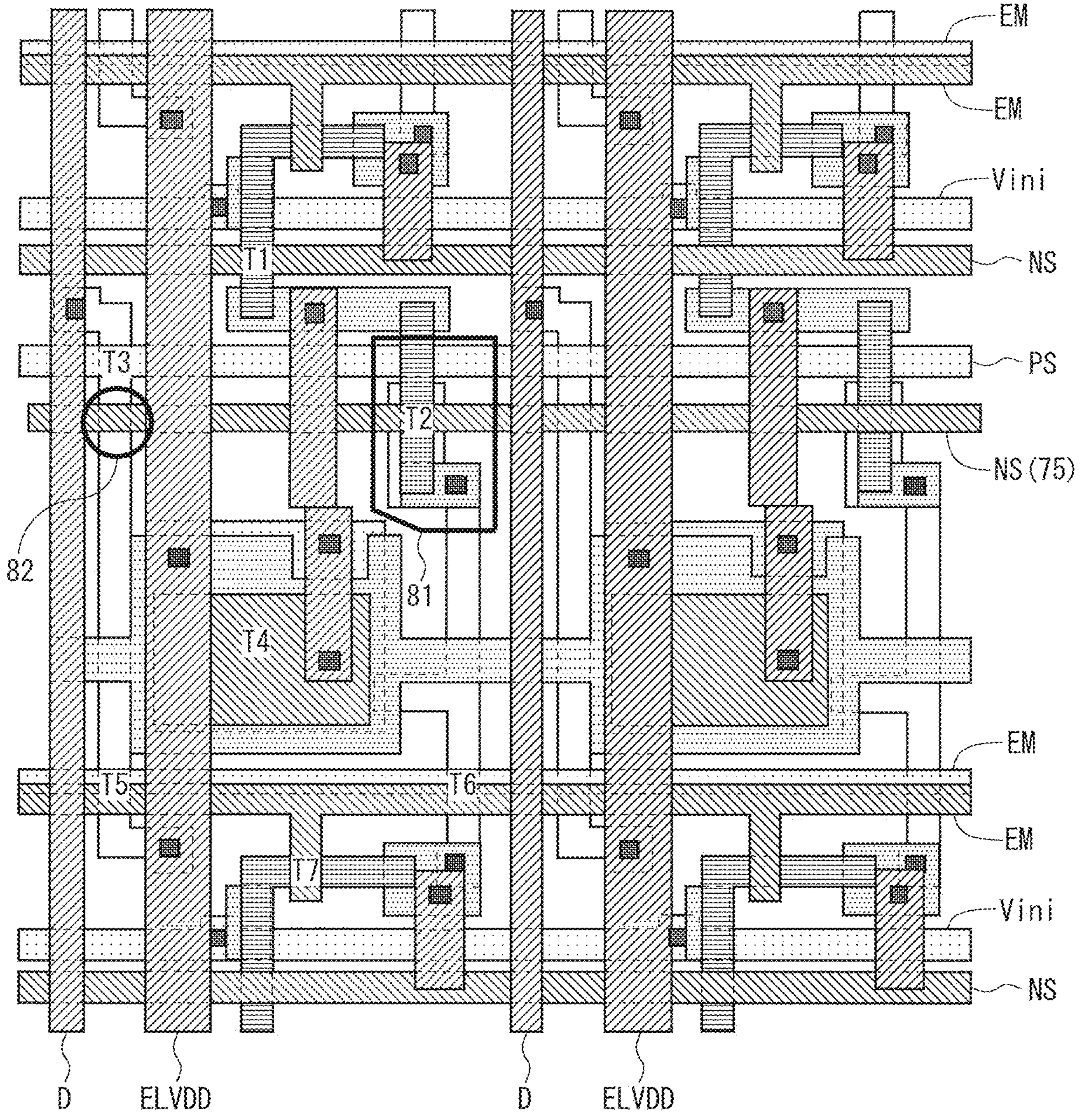
FIG. 10 is a diagram showing a layout that implements the pixel circuit having the configuration shown in FIG. 1.

FIG. 10 is a diagram showing a layout that implements the pixel circuit 20 having the configuration shown in FIG. 1. As with FIG. 4, in FIG. 10, too, locations corresponding to the gate electrodes of seven transistors T1 to T7 included in a given pixel circuit 20 are given their corresponding reference characters T1 to T7. An enlarged view of a portion given reference character 81 in FIG. 10 is shown in FIG. 11, and a cross-sectional view of the portion of FIG. 11 along line A-B is shown in FIG. 12.

Figure 12:
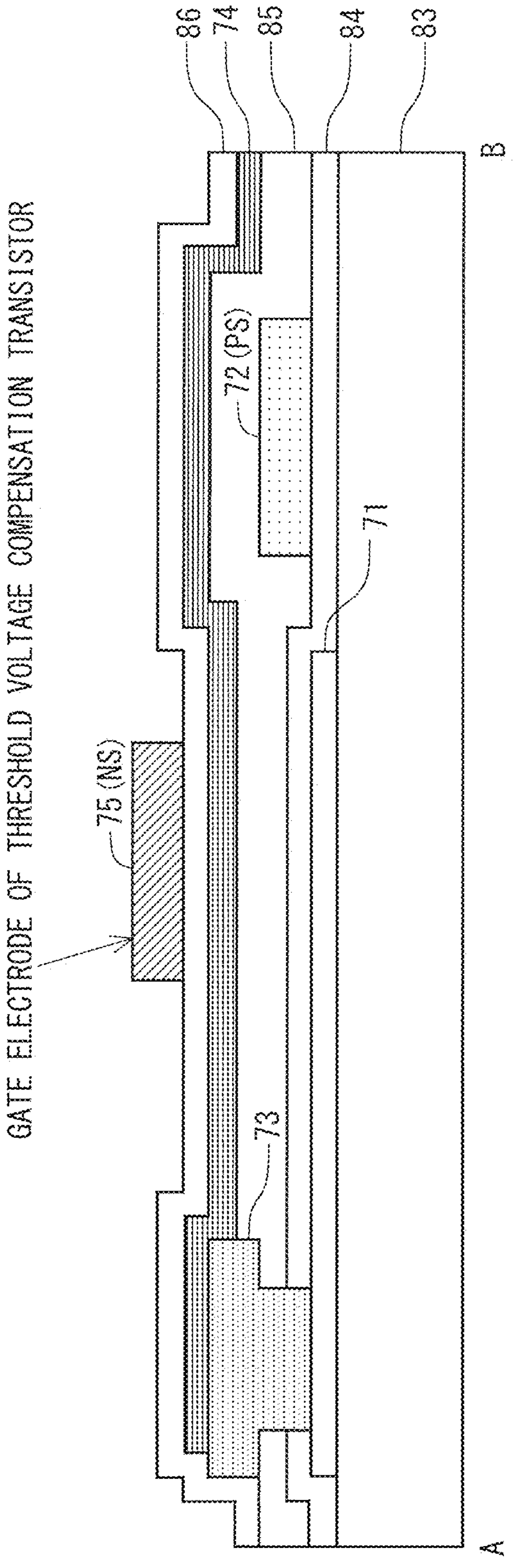
FIG. 12 is a cross-sectional view of the portion of FIG. 11 along line A-B.

In FIG. 12, a portion given reference character 83 represents a substrate, a portion given reference character 84 represents an insulating film implemented by, for example, silicon dioxide ($SiO_2$), a portion given reference character 85 represents an insulating film implemented by, for example, silicon dioxide ($SiO_2$) and a silicon nitride film (SiN), and a portion given reference character 86 represents an insulating film implemented by, for example, silicon dioxide ($SiO_2$).

Figure 11:
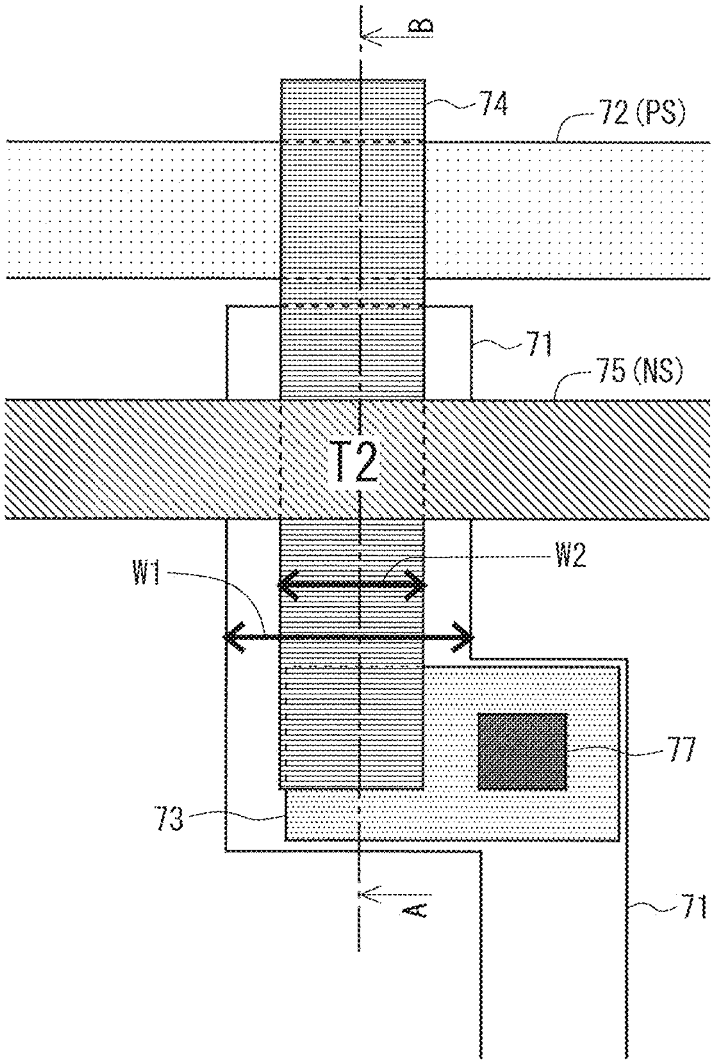
FIG. 11 is an enlarged view of a portion given reference character 81 in FIG. 10.

As can be grasped from FIGS. 10 to 12, for the threshold voltage compensation transistor T2, a part of a second scanning wiring layer 75 serving as a second scanning signal line NS functions as a gate electrode, and a second semiconductor layer 74, i.e., a layer of an oxide semiconductor, serves as a channel region. In addition, in the present embodiment, a first semiconductor layer 71, i.e., a layer of polysilicon, is used as a back-gate electrode of the threshold voltage compensation transistor T2. Meanwhile, a metal layer 73 in FIG. 11 functions as a second conductive electrode of the drive transistor T4. Thus, the layer of polysilicon connected to the second conductive electrode of the drive transistor T4 is used as the back-gate electrode of the threshold voltage compensation transistor T2. Note that in the present embodiment, as shown in FIG. 12, the metal layer 73 and the second semiconductor layer 74 are directly connected to each other without through a contact.

As above, the pixel circuit 2) having the configuration shown in FIG. 1 can be implemented by extending the layer of polysilicon (first semiconductor layer 71) that functions as the channel region of the drive transistor T4 to a position under the gate electrode of the threshold voltage compensation transistor T2 (the second scanning wiring layer 75 serving as the second scanning signal line NS). Thus, there is no need to provide an additional step in a manufacturing process of the organic EL display panel 6. Therefore, a reduction in yield caused by an increase in wiring density is prevented.

In addition, according to the configuration shown in FIG. 10, unlike the configuration of the comparative example (see FIG. 4), a parasitic transistor TX (see FIG. 6) whose gate electrode is the second scanning signal line NS is not formed near the write control transistor T3 (see a portion given reference character 82 in FIG. 10). Thus, writing into the holding capacitor C1 and a compensation process are performed normally.

Meanwhile, in order to enhance a light-shielding effect to the channel region of the threshold voltage compensation transistor T2, it is preferred that, for a direction in which the second scanning wiring layer 75 extends, the width of silicon used as the back-gate electrode of the threshold voltage compensation transistor T2 (the width of the first semiconductor layer 71) (a width corresponding to the length of an arrow given reference character W1 in FIG. 11) be larger than the width of the channel region of the threshold voltage compensation transistor T2 (the width of the second semiconductor layer 74) (a width corresponding to the length of an arrow given reference character W2 in FIG. 11). By this, occurrence of off-leakage current caused by the photovoltaic effect at the threshold voltage compensation transistor T2 can be more effectively suppressed.

3. Effects

Figure 13:
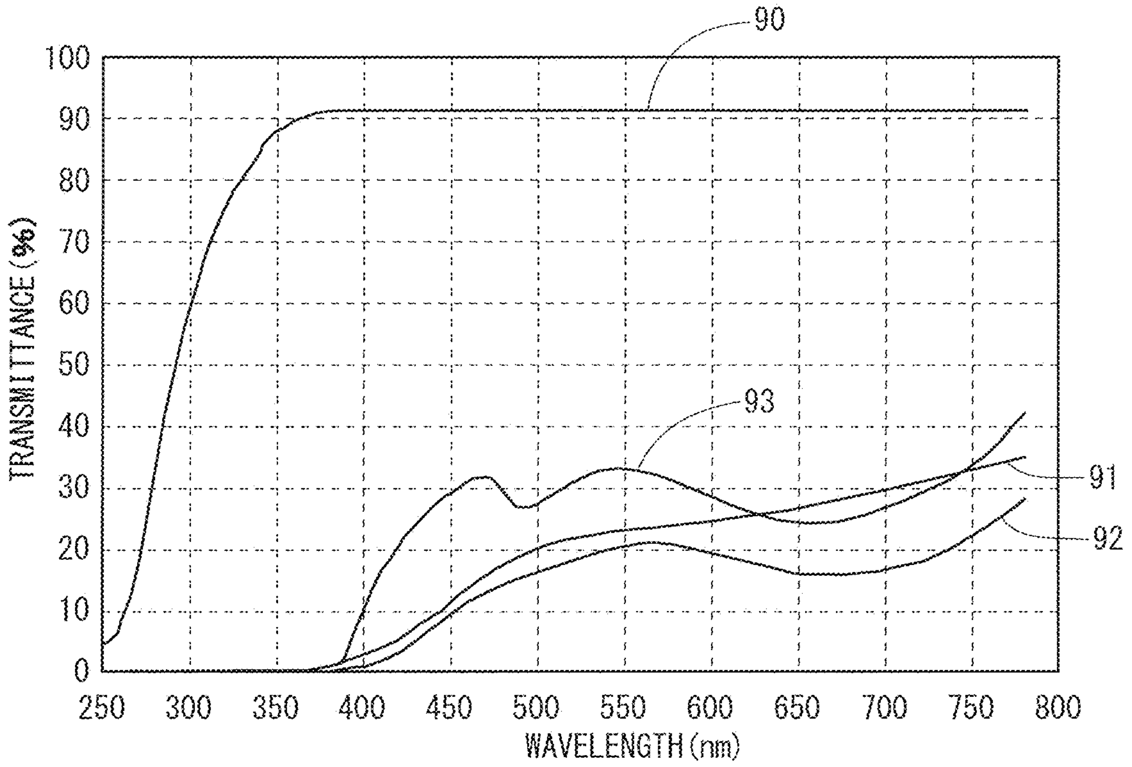
FIG. 13 is a diagram for describing the visible light transmittance of silicon films.

According to the present embodiment, an IGZO-TFT which is an oxide TFT is adopted as the threshold voltage compensation transistor T2 in the pixel circuit 20. In addition, silicon (polysilicon) connected to the second conductive electrode of the drive transistor T4 is used as the back-gate electrode of the threshold voltage compensation transistor T2. By a configuration such as that described above, occurrence of off-leakage current at the threshold voltage compensation transistor T2 which is caused by the photovoltaic effect is effectively suppressed, which will be described with reference to FIG. 13. FIG. 13 is a diagram for describing the visible light transmittance of silicon films. Note that a polysilicon film is fabricated by performing a dehydrogenation process and laser annealing in turn on an amorphous silicon film. In FIG. 13, a curve given reference character 90 represents a relationship between the wavelength of light provided and transmittance for glass, a curve given reference character 91 represents a relationship between the wavelength of light provided and transmittance for an amorphous silicon film, a curve given reference character 92 represents a relationship between the wavelength of light provided and transmittance for a silicon film having been subjected to a dehydrogenation process, and a curve given reference character 93 represents a relationship between the wavelength of light provided and transmittance for a silicon film (polysilicon film) having been subjected to laser annealing. It can be grasped from FIG. 13 that, regarding the silicon films, transmittance is low particularly in a short-wavelength region. That is, the silicon films can effectively shield, particularly, short-wavelength light. Meanwhile, the energy of light increases as its wavelength decreases, and the photovoltaic effect increases as energy provided to a semiconductor increases. Therefore, by shielding light in the short-wavelength region, an increase in off-leakage current caused by the photovoltaic effect can be effectively suppressed. The silicon films can effectively shield, particularly, short-wavelength light as described above, and thus, by using a layer of silicon (polysilicon) as the back-gate electrode of the threshold voltage compensation transistor T2, occurrence of off-leakage current at the threshold voltage compensation transistor T2 which is caused by the photovoltaic effect is effectively suppressed. As such, degradation in display quality caused by off-leakage current at the threshold voltage compensation transistor T2 is suppressed.

In addition, the back-gate electrode of the threshold voltage compensation transistor T2 of the present embodiment can be implemented by extending a layer of polysilicon that functions as the channel region of the drive transistor T4. Thus, there is no need to provide an additional step in a manufacturing process of the organic EL display panel 6, and a reduction in yield caused by an increase in wiring density is prevented.

Further, according to the present embodiment, the potential at the second conductive electrode of the drive transistor T4 is provided to the back-gate electrode of the threshold voltage compensation transistor T2. When black display is performed, almost no drive current is supplied to the organic EL element 21, and thus, the potential at the second conductive electrode of the drive transistor T4 remarkably decreases. Therefore, during a period during which black display is performed, the potential at the back-gate electrode of the threshold voltage compensation transistor T2 remarkably decreases, by which the threshold voltage compensation transistor T2 is reliably maintained in off state. In terms of this, too, degradation in display quality caused by off-leakage current at the threshold voltage compensation transistor T2 is suppressed.

As above, according to the present embodiment, in an organic EL display device including pixel circuits including oxide TFTs, degradation in display quality caused by light irradiation onto the oxide TFTs is suppressed.

4. Others

Although description is made using an organic EL display device as an example in n the above-described embodiment, the display device is not limited thereto. The above-described disclosed content can also be applied to inorganic EL display devices, QLED display devices, etc., provided that the display devices use display elements driven by current and adopt oxide TFTs as the threshold voltage compensation transistors T2 in the pixel circuits 20.

DESCRIPTION OF REFERENCE CHARACTERS

6: ORGANIC EL DISPLAY PANEL
20: PIXEL CIRCUIT
21: ORGANIC EL ELEMENT
71: FIRST SEMICONDUCTOR LAYER
72: FIRST SCANNING WIRING LAYER
73: METAL LAYER
74: SECOND SEMICONDUCTOR LAYER

75: SECOND SCANNING WIRING LAYER
76: DISPLAY WIRING LAYER
200: DISPLAY UNIT
D(1) to D(i): DATA SIGNAL, DATA SIGNAL LINE
PS(1) to PS(i): FIRST SCANNING SIGNAL, FIRST SCANNING SIGNAL LINE
NS(0) to NS(i): SECOND SCANNING SIGNAL, SECOND SCANNING SIGNAL LINE
EM(1) to EM(i): LIGHT-EMISSION CONTROL SIGNAL, LIGHT-EMISSION CONTROL LINE
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: POWER SUPPLY CONTROL TRANSISTOR
T6: LIGHT-EMISSION CONTROL TRANSISTOR
T7: SECOND INITIALIZATION TRANSISTOR

The invention claimed is:

1. A display device, comprising: a panel substrate on which pixel circuits arranged in matrix form, a first power line to which a first power supply voltage is provided, a second power line to which a second power supply voltage is provided, and a data signal line to which a data voltage is provided are formed, wherein the pixel circuits each include:

a display element provided between the first power line and the second power line and configured to emit light at luminance determined based on an amount of current supplied to the display element;

a drive transistor having a gate electrode; a first conductive electrode and a second conductive electrode, one of which functions as a drain electrode and another one of which functions as a source electrode, and a channel region formed of silicon, the drive transistor being provided in series with the display element;

a threshold voltage compensation transistor having a gate electrode, a first conductive electrode, and a second conductive electrode, one of which functions as a drain electrode and another one of which functions as a source electrode, a back-gate electrode, and a channel region formed of an oxide semiconductor; and a holding capacitor connected to the gate electrode of the drive transistor;

the first power supply voltage is provided to the first conductive electrode of the drive transistor during a period during which the display element should emit light, and the data voltage is provided to the first conductive electrode of the drive transistor during a period during which writing into the holding capacitor is performed;

the second conductive electrode of the drive transistor is connected to the first conductive electrode of the threshold voltage compensation transistor;

the gate electrode of the drive transistor is connected to the second conductive electrode of the threshold voltage compensation transistor;

silicon connected to the second conductive electrode of the drive transistor is used as the back-gate electrode of the threshold voltage compensation transistor; and the silicon that forms the channel region of the drive transistor and the silicon used as the back-gate electrode of the threshold voltage compensation transistor are polycrystalline silicon.

2. A display device, comprising: a panel substrate on which pixel circuits arranged in matrix form, a first power line to which a first power supply voltage is provided, a second power line to which a second power supply voltage is provided, and a data signal line to which a data voltage is provided are formed, wherein the pixel circuits each include:

a display element provided between the first power line and the second power line and configured to emit light at luminance determined based on an amount of current supplied to the display element;

a drive transistor having a gate electrode, a first conductive electrode, and a second conductive electrode, one of which functions as a drain electrode and another one of which functions as a source electrode, and a channel region formed of silicon, the drive transistor being provided in series with the display element;

a threshold voltage compensation transistor having a gate electrode, a first conductive electrode, and a second conductive electrode, one of which functions as a drain electrode, and another one of which functions as a source electrode, a back-gate electrode, and a channel region formed of an oxide semiconductor; and a holding capacitor connected to the gate electrode of the drive transistor, the first power supply voltage is provided to the first conductive electrode of the drive transistor during a period during which the display element should emit light, and the data voltage is provided to the first conductive electrode of the drive transistor during a period during which writing into the holding capacitor is performed;

the second conductive electrode of the drive transistor is connected to the first conductive electrode of the threshold voltage compensation transistor;

the gate electrode of the drive transistor is connected to the second conductive electrode of the threshold voltage compensation transistor;

silicon connected to the second conductive electrode of the drive transistor is used as the back-gate electrode of the threshold voltage compensation transistor;

the pixel circuits each further include a write control transistor having a gate electrode; a first conductive electrode and a second conductive electrode, one of which functions as a drain electrode and another one of which functions as a source electrode; and a channel region formed of silicon, the first conductive electrode of the write control transistor is connected to the data signal line, the second conductive electrode of the write control transistor is connected to the first conductive electrode of the drive transistor, and a first semiconductor layer including the channel region of the drive transistor, a first scanning wiring layer including the gate electrode of the write control transistor, a metal layer including the second conductive electrode of the drive transistor and the first conductive electrode of the threshold voltage compensation transistor, a second semiconductor layer including the channel region of the threshold voltage compensation transistor, a second scanning wiring layer including the gate electrode of the threshold voltage compensation transistor, and a display wiring layer including the first power line and the data signal line are stacked on top of each other on the panel substrate.

3. The display device according to claim 2, wherein the metal layer and the second semiconductor layer are directly connected to each other.

4. The display device according to claim 2, wherein for a direction in which the second scanning wiring layer extends, a width of the silicon used as the back-gate electrode of the threshold voltage compensation transistor is larger than a width of the channel region of the threshold voltage compensation transistor.

5. A display device comprising: a panel substrate on which pixel circuits arranged in matrix form, a first power line to which a first power supply voltage is provided, a second power line to which a second power supply voltage is provided, and a data signal line to which a data voltage is provided are formed, wherein the pixel circuits each include:

a display element provided between the first power line and the second power line and configured to emit light at luminance determined based on an amount of current supplied to the display element;

a drive transistor having a gate electrode, a first conductive electrode, and a second conductive electrode, one of which functions as a drain electrode and another one of which functions as a source electrode, and a channel region formed of silicon, the drive transistor being provided in series with the display element;

a threshold voltage compensation transistor having a gate electrode; a first conductive electrode and a second conductive electrode, one of which functions as a drain electrode and another one of which functions as a source electrode, a back-gate electrode, and a channel region formed of an oxide semiconductor; and a holding capacitor connected to the gate electrode of the drive transistor, the first power supply voltage is provided to the first conductive electrode of the drive transistor during a period during which the display element should emit light, and the data voltage is provided to the first conductive electrode of the drive transistor during a period during which writing into the holding capacitor is performed;

the second conductive electrode of the drive transistor is connected to the first conductive electrode of the threshold voltage compensation transistor;

the gate electrode of the drive transistor is connected to the second conductive electrode of the threshold voltage compensation transistor;

silicon connected to the second conductive electrode of the drive transistor is used as the back-gate electrode of the threshold voltage compensation transistor; and a negative voltage is applied to the back-gate electrode of the threshold voltage compensation transistor throughout a period during which black display is performed.

6. The display device according to claim 1, wherein the oxide semiconductor contains indium, gallium, zinc, and oxygen.

* * * * *